April 3, 1934.  W. PRELLWITZ  1,953,130

VALVE

Filed Nov. 6, 1931

INVENTOR.
William Prellwitz
BY
HIS ATTORNEY.

Patented Apr. 3, 1934

1,953,130

UNITED STATES PATENT OFFICE 1,953,130

VALVE

William Prellwitz, Easton, Pa., assignor to Ingersoll-Rand Company, Jersey City, N. J., a corporation of New Jersey Application November 6, 1931, Serial No. 573,333

1 Claim. (Cl. 251—144)

This invention relates to valves, but more particularly to a valve adapted for use in connection with compressors, pumps and the like for controlling the admission of fluid into and the discharge of fluid from machines of this type.

One object of the invention is to construct a valve of extremely light weight and great durability.

Another object is to eliminate the objectionable noise caused by the impact of the valve against the elements which act as stops therefore and, in consequence, to enable valves of this type to be operated at increased speeds and lifts.

Other objects of the invention will be in part obvious and in part pointed out hereinafter.

Figure 1:
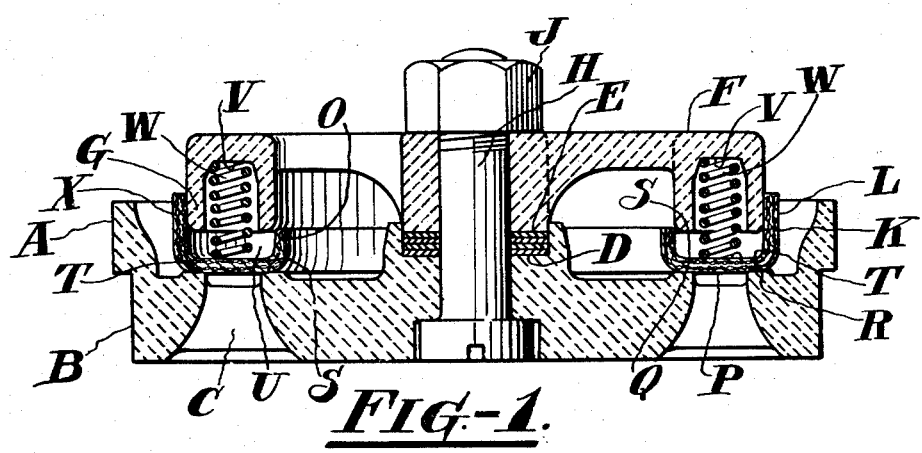
Figure 2:
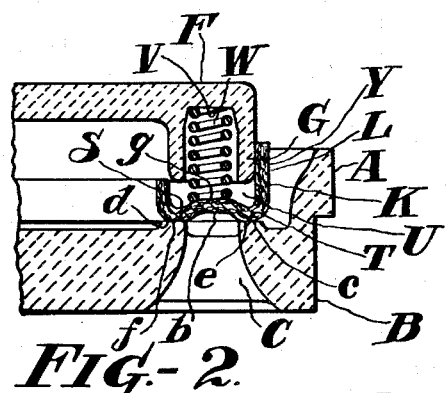
Figure 3:
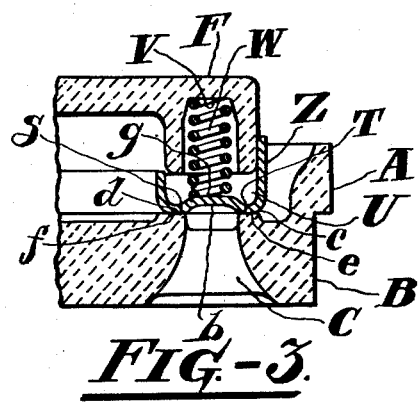
Figure 4:
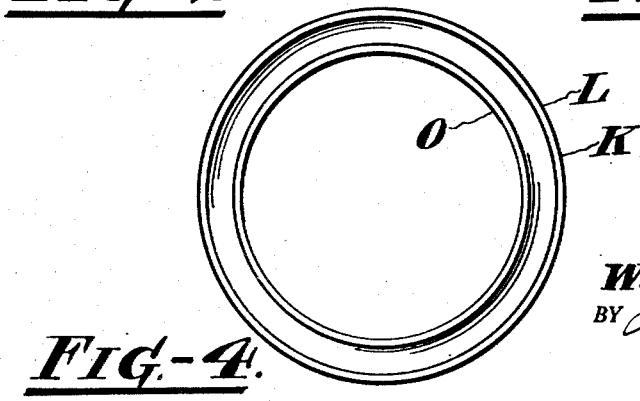

In the accompanying drawing forming a part of this specification and in which similar reference characters refer to similar parts, Figure 1 is a sectional elevation of a valve mechanism including a valve constructed of non-metallic material, such as BAKELITE, having laminæ of reinforcing material embedded therein, Figure 2 is a similar view showing a modified form of valve, Figure 3 is a sectional elevation of a portion of valve mechanism illustrating a metallic valve of the design shown in Figure 2, and Figure 4 is a top plan view of the valve.

Referring more particularly to the drawing and at first to Figure 1, A designates generally a valve mechanism comprising a valve seat B having a port or ports C therein for the passage of fluid through the valve seat. In an end surface of the valve seat B is a recess D for the reception of a hub E carried by a stop plate F which carries on its side adjacent the valve seat B a flange G arranged to overlie the port or ports C in the valve seat and being suitably spaced with respect to the valve seat.

Preferably the valve seat B and the stop plate F consists of BAKELITE or similar non-metallic material of light weight and the said valve seat and the stop plate may be conveniently secured together by a bolt H extending through these elements and having a nut J for clamping them securely together.

Disposed in the space between the valve seat B and the flange G of the stop plate F is a valve plate K of substantially the physical form illustrated in Patent No. 1,608,616 granted to me November 30, 1926 and being adapted to control the port C. The valve is accordingly provided with a pair of concentrically arranged flanges L and O connected at their ends adjacent the valve seat B by a flat plate like portion or bridge P which spans the port or ports C. The inner and outer portions Q and R of the bridge P lie on the opposite sides of the port C and constitute seating surfaces which seat against inner and outer seating surfaces S and T respectively of the valve seat B and lying on the inner and outer sides of the port or ports C.

The outer flange L of the valve serves, as in the aforesaid patent, as a guiding flange which constantly engages the outer surface of the flange G of the stop plate to maintain the valve in substantially the correct position with respect to the seating surfaces S and T. The inner flange O of the valve is of less length than the flange L to admit pressure fluid into the interior or cushioning chamber U of the valve between the flanges L and O wherein fluid may be entrapped and subsequently compressed between the valve and the flange G as the valve approaches the stop plate to prevent heavy impact of the valve against the stop plate.

In the flange G are sockets V for the reception of springs W which act or seat upon the bridge P to return the valve to the seating surfaces S and T.

The physical characteristics of the valve illustrated are, as may be observed, substantially like those of the valve in the hereinbefore mentioned patent. Unlike the patented valve, however, which is constructed of metal, the valve disclosed herein is formed of a non-metallic, though rigid, substance as for instance, BAKELITE having laminæ X of reinforcing material, such as fabric, embedded therein. The laminæ which extend entirely through all portions of the valve terminate with their outer edges at the free ends or edges of the flanges L and O in order to assure uniformity of strength throughout all portions of the valve.

In practice the valve constructed of the material specified has been found to possess great advantages over similar types of valves constructed of metal. Of these, that of comparatively light weight is highly desirable and, owing to this fact, the valve may be operated at lifts considerably in excess of those permissible in metallic valves and at greatly increased speeds. The valve has been found to be extremely durable and strong. It is, moreover, noiseless in operation which, as is well known, is a highly desirable feature in apparatuses of this character.

Another highly desirable feature of valve mechanisms of which the principal elements are constructed of BAKELITE or other similar materials possessing the desirable qualities of lightness of weight coupled with strength and freedom from distortion due to temperature changes is, that the entire assembly may be inserted in and removed from compressors and like mechanisms with considerably greater facility than like valve mechanisms constructed of metal. This is due to the fact that the total weight of the mechanism is considerably less when constructed of BAKELITE than of metal and for that reason may be handled more easily.

In the modified form of the invention illustrated in Figures 2 and 3 the valve designated by Y has the outer and inner flanges L and O respectively, with the flange L engaging the outer surface of the flange G of the stop plate F to guide the valve. The valve Y shown in Figure 2 is illustrated as consisting of BAKELITE having laminæ of reinforcing material X embedded therein, while the valve Z illustrated in Figure 3 is shown as a metallic valve but, in physical form, may be identical with the valve Y, so that a description of one will suffice for a description of both.

The valve Y, in the present instance, is provided with an intermediate bridge $b$ which preferably lies between the flanges L and O to which it may be connected by seating portions $c$ and $d$ which are off-set with respect to the flanges and the bridge $b$ and may assume the shape of curved portions of the same thickness as the bridge and the flanges.

The outer or lower surfaces of the seating portions $c$ and $d$ constitute seating surfaces $e$ and $f$ respectively which cooperate with the seating surfaces T and S of the valve seat B to control the flow of fluid through the port C. The inner or rear surface $g$ of the bridge $b$ provides a convenient seating surface for an end of the springs W which serve to hold the valve to its seat.

By constructing the valve, either Y or Z, in the manner described, material of extremely small thickness and consequently light weight may be employed. The valve will, however, possess a required rigidity to assure uniform seating thereof against the valve seat and the stop plate. By interposing the bridge between the flanges and joining said bridge thereto by means of the curved seating portions the valve will also be adequately held against distortion and consequently undue binding of the guide flange or flanges on the surfaces of the stop plate which it engages.

I claim:

Valve mechanism for compressors and the like comprising a ported valve seat, seating surfaces on opposite sides of the port of the valve seat, a phenol formaldehyde condensation product valve to control the port, a stop plate for said valve, said valve comprising a pair of concentrically arranged flanges integral with the valve and extending laterally thereof to engage the stop plate for guiding the valve, a bridge between the flanges, a pair of seating portions connecting the bridge and the flanges and cooperating with the seating surfaces to control the port, and laminæ of reinforcing material extending through the flanges, the seating portions and the bridge.

WILLIAM PRELLWITZ.